June 29, 1954 R. M. SCHULTZ 2,682,121

HYDRATOR ADAPTER

Filed June 8, 1951 8 Sheets-Sheet 1

INVENTOR.
Roy M. Schultz
BY
Thiess, Olson & Mecklenburger
Attys.

June 29, 1954 — R. M. SCHULTZ — 2,682,121

HYDRATOR ADAPTER

Filed June 8, 1951 — 8 Sheets-Sheet 2

INVENTOR.
Roy M. Schultz
BY
Thiess, Olson & Mecklenburger
Attys

INVENTOR.
Roy M. Schultz
BY.
Theo. Oken & Mecklenburger.
Attys

INVENTOR.
Roy M. Schultz
BY. Theiss, Olson & Mecklenburger
Attys.

INVENTOR.
Roy M. Schultz
BY Thiess, Olson & Mecklenburger
Attys.

June 29, 1954 R. M. SCHULTZ 2,682,121

HYDRATOR ADAPTER

Filed June 8, 1951 8 Sheets-Sheet 6

INVENTOR.
Roy M. Schultz
BY Thiess, Olson & Mecklenburger
Attys.

June 29, 1954 R. M. SCHULTZ 2,682,121

HYDRATOR ADAPTER

Filed June 8, 1951 8 Sheets-Sheet 7

INVENTOR.
Roy M. Schultz:
BY. Theiss, Olson & Mecklenburger.
Attys.

INVENTOR.
Roy M. Schultz
BY
Thiess, Olson & Mecklenburger
Attys.

Patented June 29, 1954 2,682,121

UNITED STATES PATENT OFFICE 2,682,121

HYDRATOR ADAPTER

Roy M. Schultz, Chicago, Ill., assignor, by mesne assignments, to David A. Freeman Corporation, Chicago, Ill., a corporation of Illinois Application June 8, 1951, Serial No. 230,600

17 Claims. (Cl. 38—15)

This invention relates to a garment pressing machine and more particularly to a device for use with one of the pressing elements of the machine to effect proper conditioning of a garment fabric prior to the pressing thereof. By proper conditioning is meant that the fabric fibers are made soft and pliable thereby resulting in an improved appearance of the finished garment.

In general the garment fabric is conditioned for pressing by causing steam to be directed onto the portion of the garment, disposed between the pressing elements, prior to closing of the elements thereon. The steam for conditioning the fabric is normally obtained from a steam chest formed in the pressing element. Frequently the texture of the fabric is such as to require wet steam to be directed thereonto in order to facilitate softening of the fibers.

Thus it is one of the objects of this invention to provide a device which utilizes a portion of the steam from the steam chest to form condensate which in turn is combined with the remainder of the steam from the steam chest to effect supersaturated steam which is used in properly conditioning the garment fabric.

It is a further object of this invention to provide a device which will enable the operator to readily vary the moisture content of the steam used for fabric conditioning.

It is a further object of this invention to provide a device which uses the pressure of the steam to cause the condensate to combine with the steam to effect supersaturation thereof and thereby eliminates the need for auxiliary pumps and the like to maintain the proper relative pressure of the condensate with respect to the steam.

It is a further object of this invention to provide a device which will cause the steam from the steam chest of the pressing element to be combined with a liquid which is substantially free of garment staining ingredients.

It is a further object of this invention to provide a device which enables the condensate to be directed onto the fabric only in combination with steam thereby minimizing the possibility of water-spotting the fabric.

It is a still further object of this invention to provide a device which is simple and compact in construction, effective in operation, and adapted to be used with various types of garment pressing machines.

Further and additional objects will appear from the description, accompanying drawings, and appended claims.

In accordance with one embodiment of this invention a device is provided for use with a pressing element which has a cavity formed therein through which steam is circulated. The device comprises a steam and condensate mixing unit mounted on the pressing element and having the input side thereof operatively connected to the steam cavity of the element, and a steam condenser mounted on said element and operatively connected to said cavity and the input side of said unit. The unit is provided with an output side and has leading therefrom a conduit which terminates at the pressing surface of the element. Disposed within the output side of the unit is a flow valve which regulates the discharge of the mixed condensate and steam at the pressing surface of the element. The ratio of condensate to steam in the mixture of steam and condensate is determined by the rate of flow of the steam through the mixing unit and the setting of the condensate flow valve.

For a more complete understanding of this invention reference should be made to the drawings, wherein Fig. 1 is a diagrammatic view of the device and the head of a pressing machine showing the steam and condensate flow indicated by arrows;

Fig. 4 is a fragmentary sectional view of the mixing unit taken along line 4—4 of Fig. 3;

Figure 1:
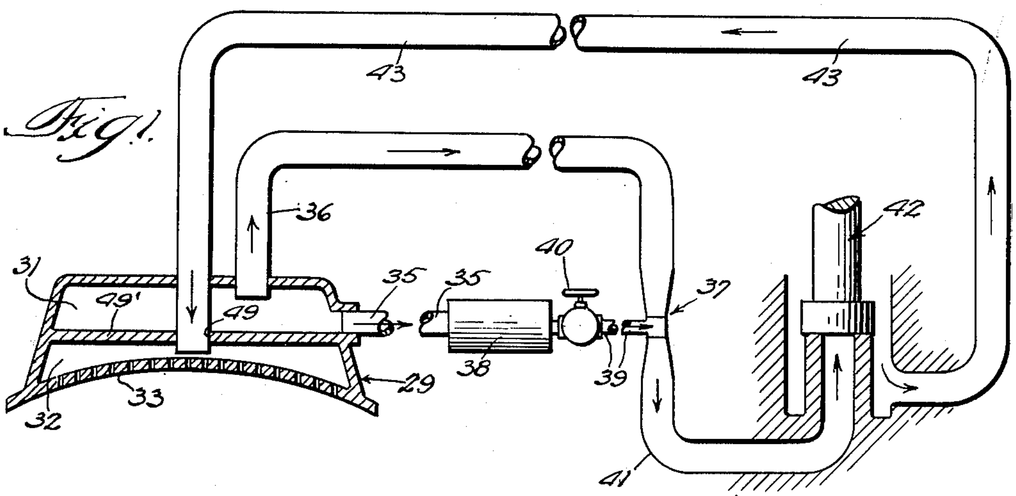

Referring now to the drawings and more particularly to Fig. 1 a pressing head 29 of a conventional garment pressing machine 30 (see Fig. 27), is diagrammatically shown in combination with the hydrator adapter device. The pressing head 29 has formed therein a steam chest 31 and a distributing chamber 32 disposed therebeneath. The distributing chamber 32 is adjacent the pressing surface 33 of the head. The pressing surface 33 is perforated so as to enable the steam or wet steam which is discharged into chamber 32 to pass therefrom to the exposed portion of surface 33. The steam chest 31 is provided with steam inlet and return passages 34 and 35, respectively, which enable steam supplied from an outside source, not shown, to be circulated therethrough, see Fig. 2. Mounted on the upper side of pressing head 29 and connected to the steam chest 31 is a conduit 36 through which a portion of the dry steam, contained within the steam chest, is directed to a Venturi chamber 37. The dry steam at chamber 37 is combined with water or condensate to form wet steam. The water which is combined with the steam in the Venturi chamber is normally obtained from condensate formed from a portion of the steam contained within chest 31.

The condensate is formed within a condenser 38, diagrammatically shown in Fig. 1, which is operatively connected to the steam return line 35. A valve 40 is provided which regulates the maximum flow of the condensate from the condenser 38 to the Venturi chamber 37. The output side of the valve 40 is connected by a conduit 39 to Venturi chamber 37. Subsequent to the steam and condensate mixing in Venturi chamber 37, the wet steam is directed through a conduit 41 to a main control valve 42 for the wet steam. Valve 42 is normally in a closed position as shown. Upon valve 42 being opened the wet steam passes from conduit 41 into another conduit 43. The wet steam is then directed through conduit 43 to the distributing chamber 32 of the pressing head 29 whereupon it is distributed over the exposed portion of surface 33.

The pressing head 29 on which the device is placed has mounted thereon a handle 44 which enables the operator to readily move the head 29 from its open position, wherein it is angularly disposed with respect to the buck 44', to a closed or pressing position with respect to the stationary buck 44'. The amount of pressure exerted by the pressing head 29 on the buck 44' is regulated by a pair of control levers 45 and 46 which are mounted in spaced relationship on the head.

Figure 2:
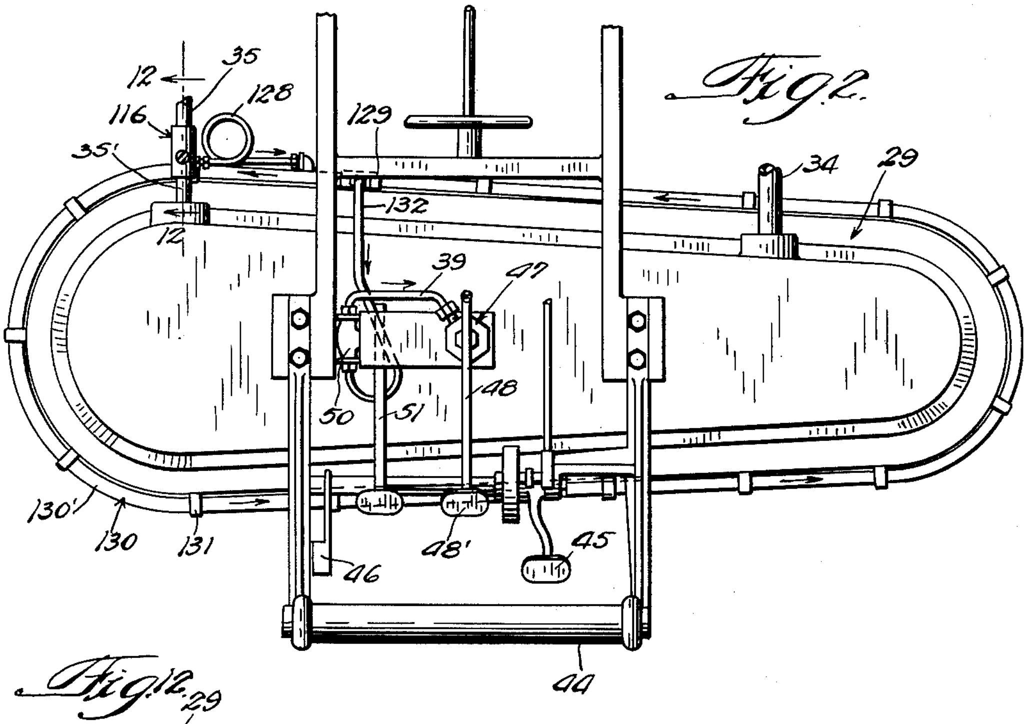
Fig. 2 is a fragmentary top plan view of one form of the device shown mounted on a pressing head.

The mixing unit 47 which forms a part of the hydrator adapter device is mounted on the upper side of the head. A pivotally mounted control lever 48 is provided on the head 29 for regulating the main wet steam control valve 42 which is disposed within mixing unit 47. As shown in Fig. 2, a condensate or water flow valve 50 is mounted on the upper side of the head 29 adjacent the mixing unit 47. A pivotally mounted control lever 51 is provided on the head 29 for regulating valve 50.

Figures 3, 6, 9, 10, 11:
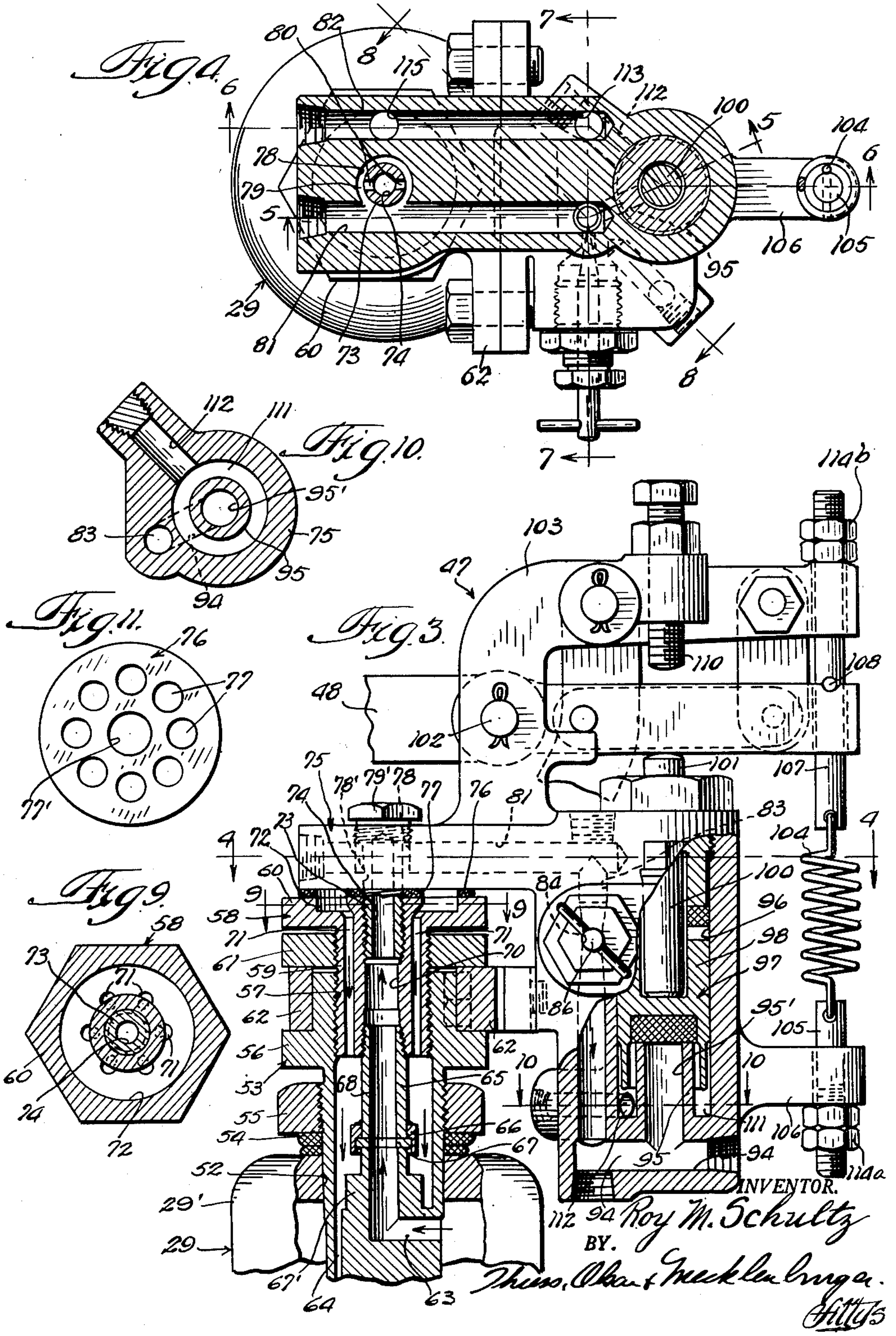
Fig. 3 is a fragmentary side elevational view of the mixing unit with portions thereof in vertical section.
Fig. 6 is a fragmentary sectional view of the mixing unit taken along line 6—6 of Fig. 4.
Fig. 9 is a fragmentary sectional view of the mixing unit taken along line 9—9 of Fig. 3.
Fig. 10 is a fragmentary sectional view of the mixing unit taken along line 10—10 of Fig. 3.
Fig. 11 is a top plan view of the gasket disposed between the adapter piece and housing of the mixing unit.
Figure 17:
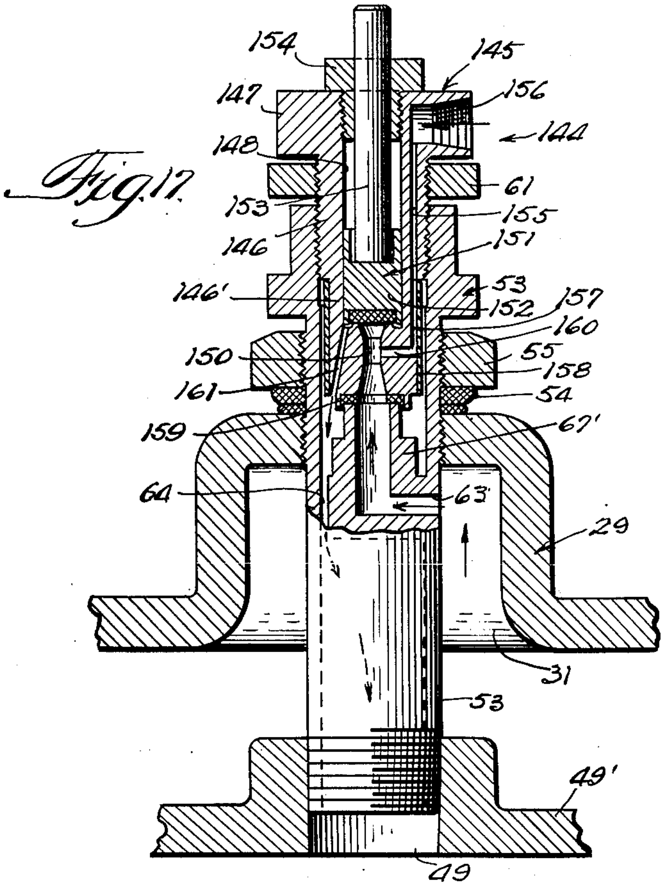
Fig. 17 is a fragmentary vertical sectional view of a third modified form of the mixing unit.
Figure 6:
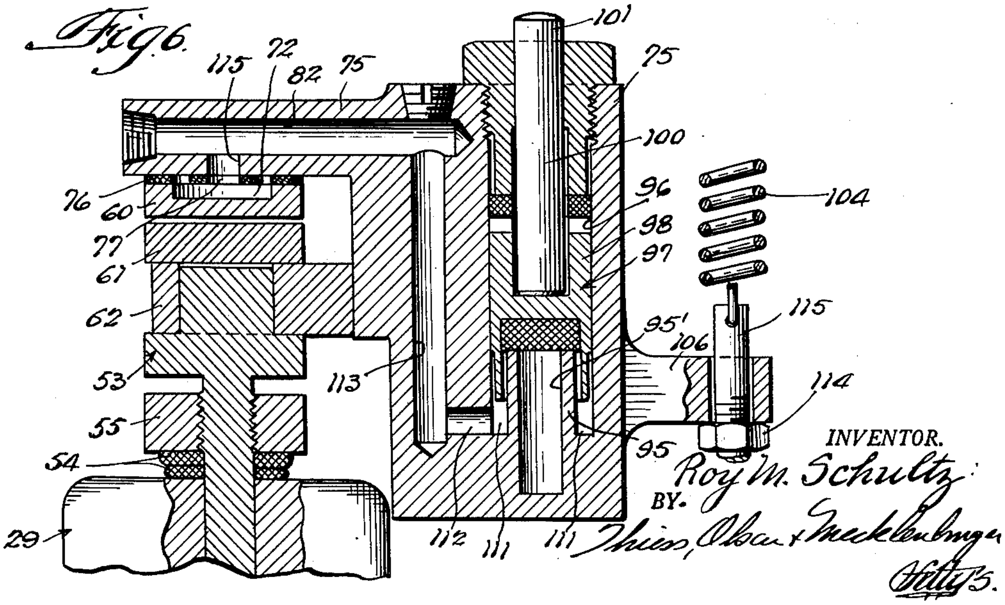

One form of the mixing unit 47 is shown in detail in Fig. 3 and is adapted to be mounted within an opening 52 formed within a domelike portion 29' of the pressing head 29. The mixing unit 47 comprises an axially-bored cylindrically-shaped connecter element 53 which extends through opening 52 and has the lower end thereof threaded into an opening 49 formed in the partition 49' separating the steam chest 31 from the distributing chamber 32, in a manner as shown in Fig. 17. Suitable sealing material 54 surrounds connecter element 53 and is held in place against domelike portion 29' by a holding nut 55 which is threadably mounted on the outer periphery of connecter 53, as shown in Fig. 3 The connecter element 53 is provided with an outwardly extending shoulder 56 which is spaced from the upper end of the connecter element. The upper end portion of the axial bore of connecter element 53 has formed therein internal threads 57 and is adapted to receive an adapter piece 58.

The adapter piece 58 is provided with an externally threaded shank portion 59 and a hexagonal head portion 60. Threadably mounted on the shank portion 59 is a clamping nut 61 which is adapted to clamp a bracket 62 between shoulder 56 of connecter element 53 and the underside of the clamping nut 61. The bracket 62 is used for mounting an adapter housing 75 to the adapter piece 58 and connector element 53. The housing 75 will be described more fully hereinafter.

The lower end portion of connecter element 53 is provided with a steam inlet port or passage 63 which has one end thereof terminating within the steam chest 31. The port 63 is formed within a nozzlelike portion 67' projecting inwardly and upwardly into the center bore of connecter element 53. A second port or passage 64 for wet steam is formed in the lower end portion of element 53 between the periphery of the center bore of element 53 and the nozzlelike portion 67'. The passage 64 is operatively connected to the distributing chamber 32 formed in the pressing head 29.

Mounted on the lower end of the shank portion 59 of adapter piece 58 and extending downwardly therefrom is a sleeve 65. A collar 66 is provided on the lower end of sleeve 65 which is adapted to seat on a flange 67 formed on the upper end of nozzlelike portion 67' formed in connecter element 53. The axial opening 68 formed in sleeve 65 is adapted to be disposed concentrically with respect to passage 63 when the adapter piece 58 is properly mounted on connecter element 53. By proper mounting of the piece 58 on the connecter element 53 is meant that the piece is threaded into connecter 53 until the collar 66 on sleeve 65 and the flange 67 on nozzlelike portion 67' abut one another and effect a sealed joint.

The shank portion 59 of adapter piece 58 is provided with a center passage 70 which is disposed concentrically with respect to the axial opening 68 formed in sleeve 65. Symmetrically arranged about passage 70 are a plurality of narrow longitudinally-extending passages 71. The lower end of the passages 71 are operatively connected to the outlet port 64 formed in connecter element 53. The upper ends of passages 71 terminate within a circular recess or well 72 formed in the head portion 60 of the adapter piece 58.

Threadably mounted into the upper end of passage 70 formed in adapter piece 58 is tubular section 73 provided with a center passage 74 which is concentrically disposed with respect to passage 70. The upper end portion of section 73 is threaded into a suitable opening 78' formed in an adapter housing 75. The upper end 78 of opening 78' is countersunk. A plug 79' caps opening 78'. The diameter of the countersunk end 78 of opening 78' is greater than the outside diameter of sleeve 73 thus resulting in a clearance 79 therebetween. A pair of diametrically opposed, radially-extending passages 80 are formed in the upper end of sleeve 73 and serve to connect the central passage 74 formed in the sleeve with the clearance 79.

Disposed intermediate adapter housing 75 and the head portion 60 of adapter piece 58 is a sealing gasket 76 which is provided with a center opening 77' through which tubular section 73 extends and a plurality of openings 77 arranged symmetrically thereabout. The openings are adapted to be in registration with the recess 72 formed in hexagonal head 60 of piece 58.

The adapter housing 75, which, as heretofore mentioned, is mounted on the connecter element 53 and adapter piece 58 by bracket 62, has formed therein a pair of elongated passages 81 and 82 which are arranged in parallel relationship with respect to one another. Passage 81 is designated as the dry steam passage and is disposed adjacent opening 78' so that the countersunk end 78 thereof is interconnected with passage 81, as seen in Fig. 4. Passage 82 will be hereinafter referred to as the wet steam passage.

The inlet port 63 formed in connecter 53, the opening 68 formed in sleeve 65, the center passage 70 formed in adapter piece 58, the passage 74 formed in tubular section 73, and the steam passage 81 formed in adapter housing 75 form the conduit, designated 36 in Fig. 1, through which the dry steam passes from the steam chest 31 to the Venturi chamber 37.

Figure 7:
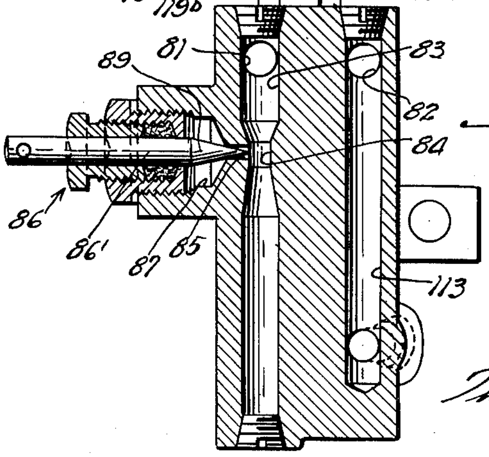
Fig. 7 is a fragmentary sectional view of the mixing unit taken along line 7—7 of Fig. 4.

Disposed at the end of passage 81 and extending downwardly therefrom is Venturi passage 83 which corresponds to the Venturi chamber 37 in Fig. 1. The throat 84 of Venturi passage 83 has formed therein a port 85, see Fig. 7, through which the condensate is directed to effect mixing of the dry steam and condensate to produce supersaturated or wet steam. Port 85 interconnects a chamber 87 formed in housing 75 with the throat 84 of passage 83. Mounted within chamber 87 is a hand operated valve 86 for regulating maximum flow of the condensate into Venturi chamber 83. The stem 86' of the valve 86 has one end 89 thereof tapered and restrictively disposed within port 85. Valve 86 corresponds to the valve 40 diagrammatically shown in Fig. 1.

Figure 8:
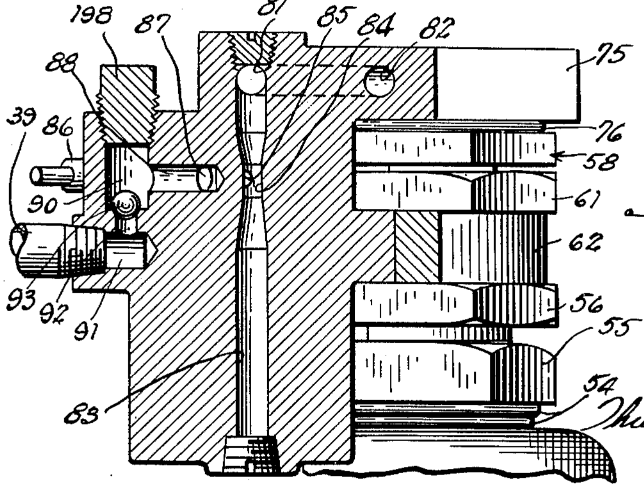
Fig. 8 is a fragmentary sectional view of the mixing unit taken along line 8—8 of Fig. 4.

A plurality of interconnected passages 88, 90, 91 and 92, see Fig. 8, are formed in housing 75 through which the condensate flows from the condenser, or any other suitable source, to the chamber 87. The passage 92, which is disposed between and interconnects passages 90 and 91, is relatively narrow and has restrictively positioned at one end thereof a ball check 93. The ball check serves to prevent reverse flow of the condensate from chamber 87.

It is believed that the theory and effect of the Venturi principle is so well understood by those skilled in the art that a discussion thereof is deemed superfluous.

Subsequent to the mixing of the condensate and steam in throat 84 of passage 83 by the Venturi principle, the wet steam is directed through interconnecting passages 94 and 95' to the valve head 98 of the main control valve 97 for the wet steam. Passages 94 and 95' correspond to the conduit 41 shown in Fig. 1. Passage 95' is formed in a nozzlelike protuberance 95 which is disposed within a chamber 96 formed in housing 75. The valve head 98 is positioned within chamber 96 and is adapted to normally seal off the upper end of passage 95'. Extending upwardly from valve head 98 and disposed within chamber 96 is a valve stem 100 having the upper end 101 thereof exposed and adapted to be engaged by the underside of control lever 48.

The control lever 48 is pivotally mounted at 102 to an upwardly extending bracket 103 formed on the adapter housing 75. The valve head 98 is adapted to normally seal off passage 95' by reason of coil spring 104 which causes a downward force to be exerted on the stem 100 by lever 48. The spring 104 has the lower end thereof connected to a pin 105 which is mounted on a lug portion 106 formed on the outer periphery of adapter housing 75. The upper end of spring 104 is connected to a pin 107 which is mounted on a projecting portion of bracket 103. Extending transversely from pin 107 is a stud 108 which is adapted to normally seat in a notch 109 formed in the upper surface of the corresponding end of control lever 48. The tension of spring 104 may be varied by adjustment of either nuts 114a or 114b which are threadably mounted on the ends of pins 105 and 107, respectively. The movement of lever 48 in a counterclockwise direction about point 102, which determines the extent to which valve head 98 is unseated, is regulated by a stop 110 threadably mounted on an extension of bracket 103, see Fig. 3. When the lever 48 is caused to move in a counterclockwise direction about point 102 by the operator depressing the handle 48' thereof, the pressure of the wet steam causes valve head 98 to be unseated. The amount of wet steam which passes valve head 98 is dependent upon the amount of force exerted on the handle 48' by the operator. Upon the valve head 98 being unseated, the wet steam flows into the portion 111 of the chamber 96 which surrounds protuberance 95. The wet steam passage 82 as heretofore described is operatively connected to the portion 111 of chamber 96 by a pair of interconnecting passages 112 and 113 formed in housing 75, as seen in Fig. 4. The wet steam passes from passage 82 through a transversely extending port 115 (see Figs. 4 and 6) which is in registration with one of the openings 77 formed in gasket 76. As heretofore mentioned, the openings 77 of gasket 76 are in registration with the recess 72 formed in the head portion 60 of adapter piece 58. From the recess 72, the wet steam passes through the narrow symmetrically arranged passages 71 to port 64 and then into the distributing chamber 32 of the pressing head.

As heretofore mentioned, the condensate for mixing with the dry steam is obtained by causing a portion of the return steam to be by-passed as it leaves the steam chest 31. To effect this by-passing of the dry steam from the chest 31, a check valve 116 is mounted on the return line 35, as seen in Fig. 2.

Figure 12:
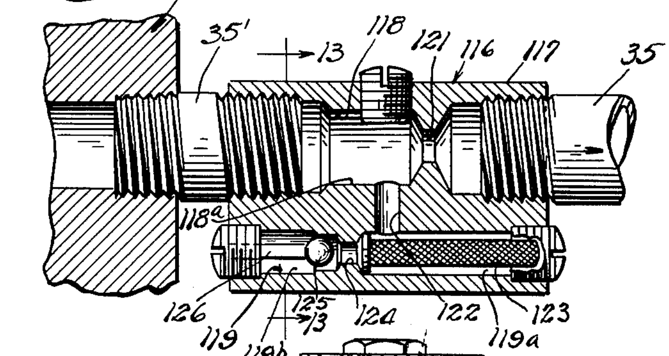
Fig. 12 is a fragmentary sectional view of the condensate check valve taken along line 12—12 of Fig. 2.
Figure 13:
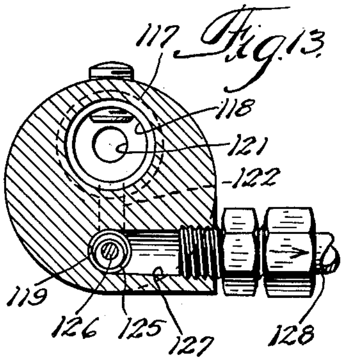
Fig. 13 is a fragmentary sectional view of the condensate check valve taken along line 13—13 of Fig. 12.

The check valve 116, as shown in detail in Figs. 12 and 13, comprises a valve housing 117 having formed therein a relatively large upper passage 118 and a small lower passage 119. The passages are arranged in a substantially parallel relationship with respect to one another and are interconnected by port 122. To one end of passage 118 is threaded a nipple 35′ which terminates within the steam chest 31. To the other end of passage 118 is threaded return line 35 which leads to the steam source, not shown. Approximately centrally positioned of passage 118 is formed a throat 121 which effects a backing-up of the steam in the left hand portion 118*a* of passage 118 as viewed in Fig. 12. The interconnecting port 122, above referred to, is disposed on the left side of the throat 121 formed in passage 118 and causes a portion of the backed-up steam to find its way through port 122. The lower passage 119 formed in the valve housing 117 comprises right and left hand portions 119*a* and 119*b*, respectively, as seen in Fig. 12. Port 122 connects left hand portion 118*a* of passage 118 to the right hand side 119*a* of passage 119. Disposed within right hand portion 119*a* of passage 119 is an elongated filter 123 which serves as a strainer for the dry steam prior to its being condensed. A narrow passage 124 interconnects the right and left hand portions of passage 119. Disposed within the left hand portion 119*b* of passage 119 is a ball check 125, which is adapted, when the pressing head 29 is in its open or angular position with respect to the buck 44′, to seal off passage 124, thus preventing any condensate which may accumulate in the condenser 130 to be prevented from flowing back into the return line 35. A ball stop 126 is threadably mounted within passage 119*b* and limits the movement of ball 125 when it is unseated. The ball 125 becomes unseated and passage 124 is opened, when the pressing head is brought into a substantially horizontal position by the operator. Gravity and the weight of the ball check 125 plus the steam pressure which has developed in the right hand side 119*a* of passage 119 causes the ball check 125 to assume the position as seen in Fig. 12. A transversely-extending passage 127 is formed in valve housing 117 which connects with the left hand portion 119*b* of passage 119 as shown in Fig. 13. Connected to the other end of passage 127 is a tube 128 which leads to the condenser, see Fig. 2.

The preferred form of condenser 130 is shown in Fig. 2, and comprises an elongated tubular member 130′ which is mounted by suitable brackets 131 to the peripheral surface of pressing head 29. The condenser 130 is of such length that the steam which is introduced at one end of the condenser is caused to travel a sufficient distance before being removed therefrom that it becomes relatively cool and forms condensate. The outlet 129 for condenser 130 is disposed slightly lower than the inlet therefor, thus insuring that condensate will be adjacent the outlet when the pressing head is in a substantially horizontal position. A tube 132 interconnects the condenser 130 and the condensate control valve 50. When valve 50 is opened and the pressing head 29 is in its substantially horizontal position, the pressure of the steam in return line 35 creates sufficient force so as to readily cause the condensate to flow through the condenser 130 and out tube 132 to mixing unit 47 wherein it combines with the dry steam to form a supersaturated or wet steam.

Figure 18:
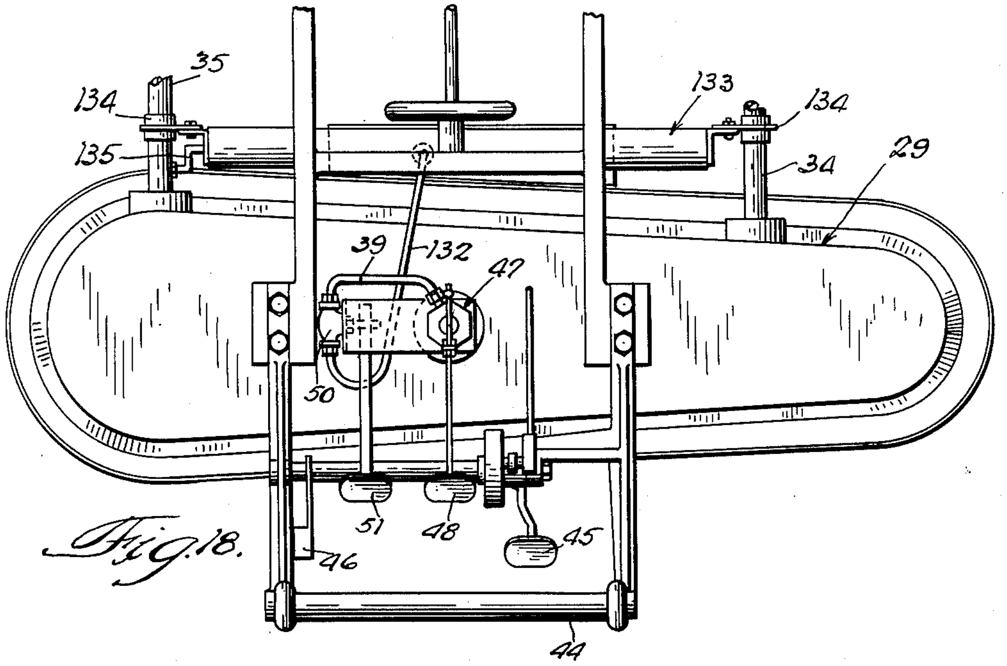
Fig. 18 is a fragmentary top plan view of a pressing head having a modified form of condenser mounted thereon.
Figures 5, 19:
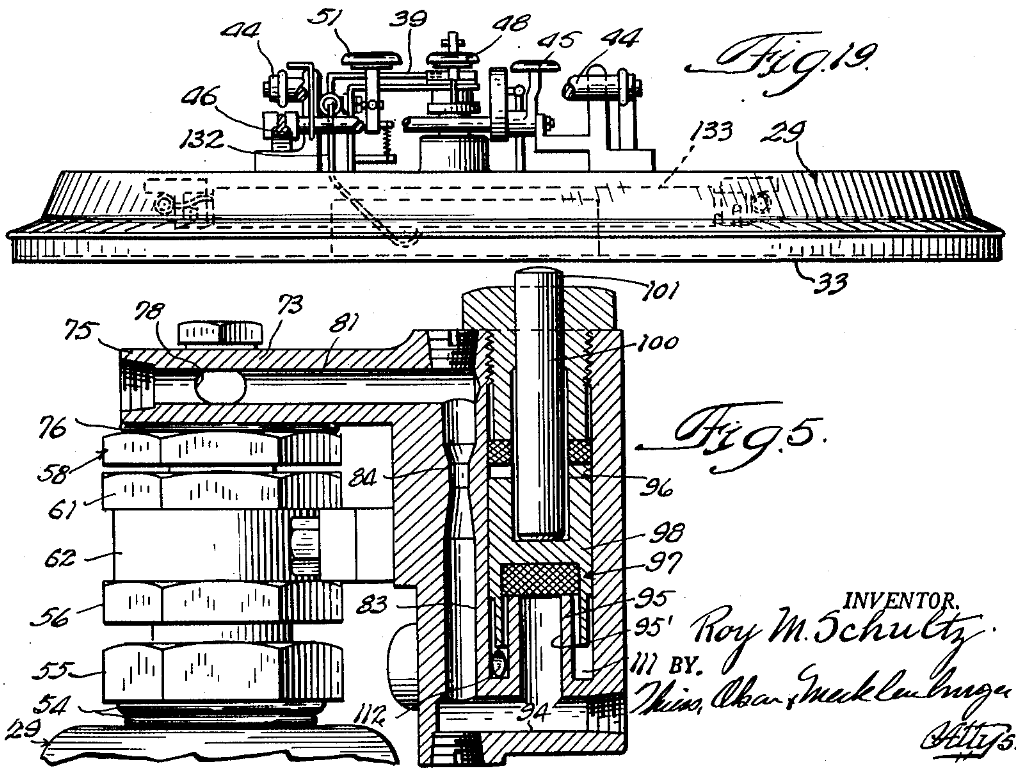
Fig. 5 is a fragmentary sectional view of the mixing unit taken along line 5—5 of Fig. 4.
Fig. 19 is a front elevational view of the pressing head shown in Fig. 18.

A modified form of condenser 133 is shown in Figs. 18 and 19. The condenser is cylindrical in shape and is mounted on the backside of the pressing head 29 intermediate the steam inlet and return lines 34 and 35, respectively. Suitable brackets 134 are provided for supporting condenser 133 and are adapted to engage the steam outlet and steam return lines. Condenser 133 is adapted to move as a unit with the pressing head 29. A tube 135 is provided which interconnects the steam return line 35 and the input end of condenser 133. The condensate which is formed in condenser 133 is removed therefrom through a connecting tube 132 which is connected at one end on the underside of the cylindrical condenser 133 and substantially centrally thereof and at the other end to the condensate control valve 50.

Figure 27:
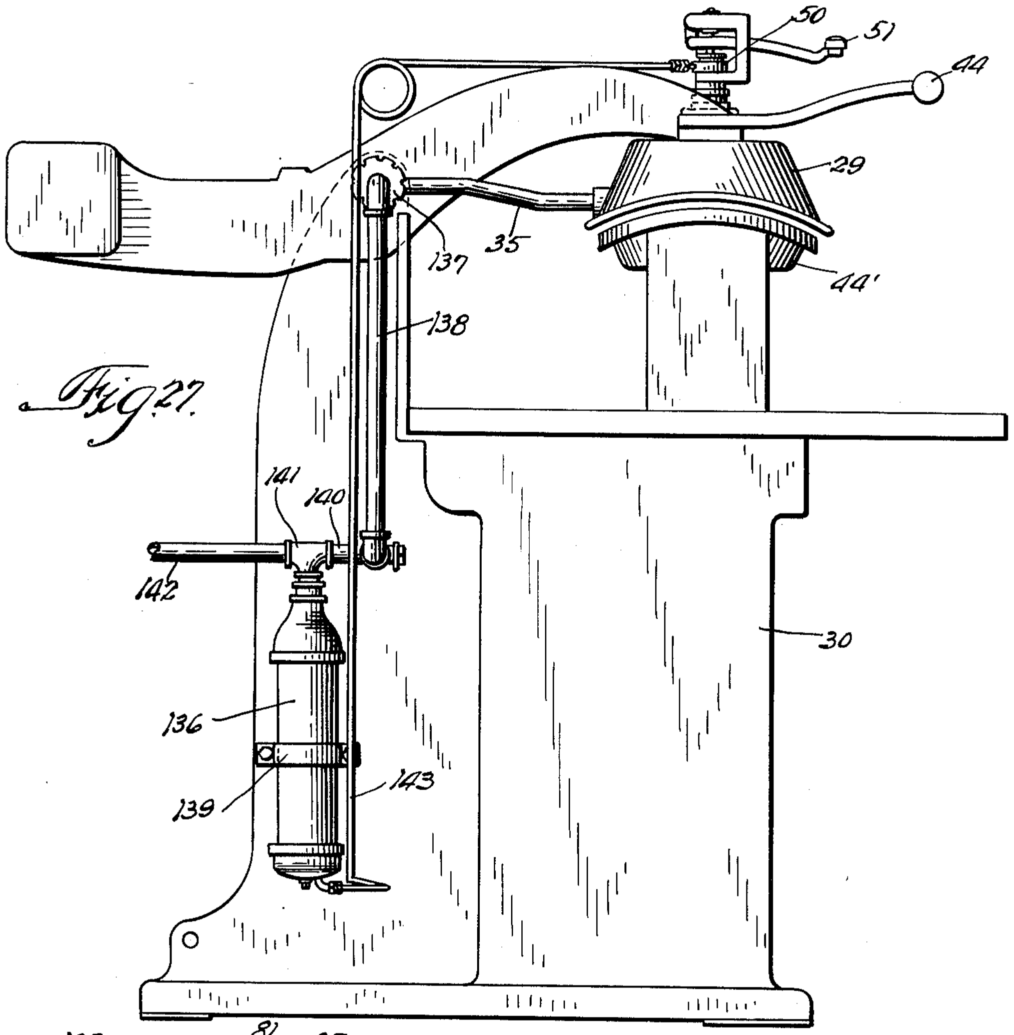
Fig. 27 is a fragmentary side elevational view of a garment pressing machine having a third modified form of condenser mounted thereon.

Another modified form 136 of steam condenser is shown in Fig. 27, which is rigidly mounted on the frame of the pressing machine 30 by a strap 139. In this instance the steam return line 35 from the pressing head 29 terminates in an adjustable connector 137. Extending downwardly from connector 137 is a stationary tube 138. The lower end of tube 138 is interconnected to the right hand port of a T connection 141 by a nipple 140. The center port of the T connecter 141 is interconnected to the upper side of condenser 136. The left hand port of the T connecter is interconnected to a return pipe 142. A flexible condensate tube 143 effects interconnection of the bottom side of condenser 136 and the control valve 50 which is mounted to pressing head 29.

A modified form 144 of a mixing unit is shown in Fig. 17 which is adapted to be mounted within the connecter element 53 which has heretofore been described. Unit 144 comprises an adapter piece 145 having the shank portion 146 thereof threaded into the upper end of connecter 53. The adapter piece 145 is provided with a hexagonal-shaped head 147 formed at the upper end of shank portion 146. The adapter piece 145 is provided with a center bore 148 in which is slidably mounted wet steam control valve 151. The lower end 150 of the center bore is shaped into a Venturi chamber wherein the steam from the steam chest and the condensate from the condenser, not shown, is mixed to form wet steam. The valve 151 is provided with a valve head 152 which is adapted to normally seal off the Venturi chamber 150 as shown in Fig. 17. The stem 153 of valve 151 extends upwardly from valve head 152 and is adapted to project through a guide cap 154 which is threadably mounted in the upper end of center bore 148. Formed in shank portion 146 of adapter piece 145 and parallel with respect to center bore 148 is a narrow passage 155. The upper end of passage 155 is interconnected with a transversely disposed port 156 formed in head 147 of piece 145. The periphery of the lower end 146' of shank portion 146 of piece 145 is reduced in size. The lower end of passage 155 terminates at the point where the shank size is reduced and is interconnected with a passage 157 which is formed by a groove, formed in the periphery of the lower end portion 146' of the shank 146, and the interior periphery of a cylindrical sleeve 158 which fits snugly on portion 146'. A transversely extending port 160 is formed in the lower end portion 146' of the piece and is adapted to interconnect passage 157 with the throat of the Venturi chamber 150.

As in the case of the mixing unit 47, shown in Fig. 3, adapter piece 145 is threaded into connecter element 53 a sufficient amount so as to cause the bottom edge of piece 145, on which is formed a depending flange 159, to abut the upper end of nozzlelike portion 67'. When the adapter piece 145 is so positioned, the Venturi chamber 150 and passage 63 are concentric with respect to one another.

The valve stem 153 is actuated downwardly by a control lever, not shown. Upon the downward pressure on the stem 153 being released the valve head 152 is caused to be unseated by the pressure of the steam contained within steam chest 31. When the valve head 152 is unseated the dry steam flows from the steam chest 31 to the throat of the Venturi chamber 150 at which point it is mixed with the condensate. The wet steam then passes from the Venturi chamber 150 into the lower portion of center bore 148 and then through a narrow conduit 161 formed in the lower end portion of the adapter piece 145. The conduit 161 serves to interconnect center bore 148 with the wet steam outlet port 64 formed in connecter element 53.

Figure 14:
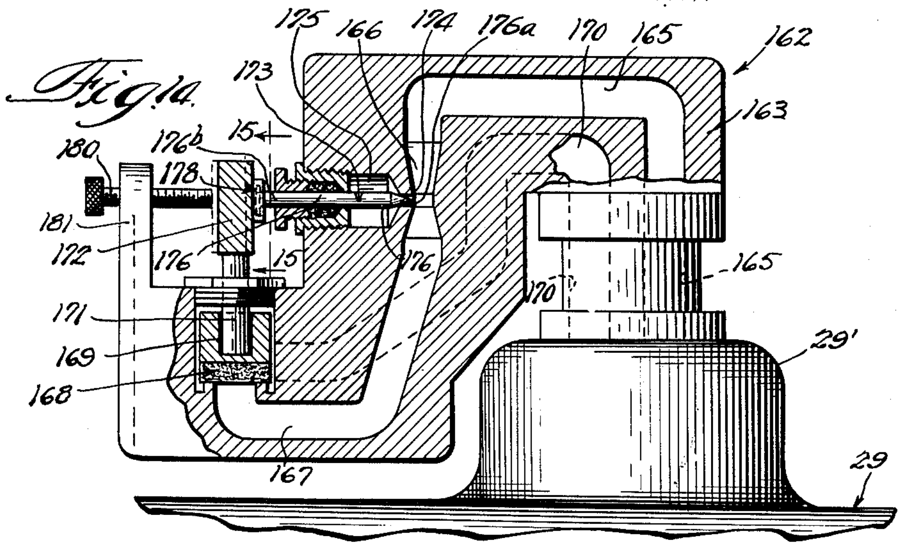
Fig. 14 is a fragmentary vertical sectional view of a modified form of the mixing unit.
Figure 15:
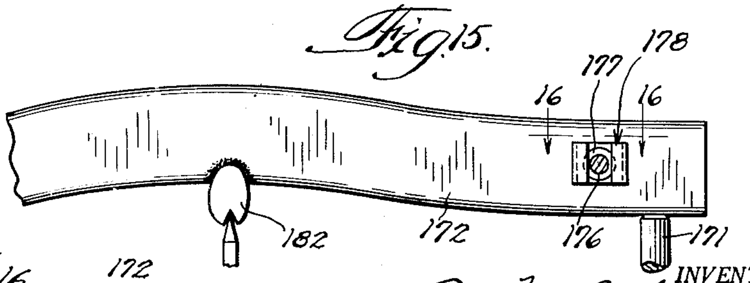
Fig. 15 is a fragmentary sectional view of the modified unit taken along line 15—15 of Fig. 14.
Figure 16:
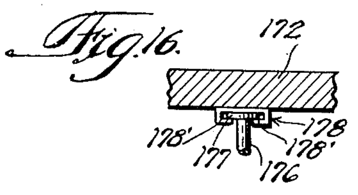
Fig. 16 is a fragmentary sectional view of the modified unit taken along line 16—16 of Fig. 15.

A second modified form 162 of mixing unit is shown in Fig. 14 comprising a housing 163 which is mounted on the dome-like portion 29' of the pressing head 29. The housing 163 has formed therein a dry steam inlet port 165 having one end thereof terminating within steam chest 31 and the other end thereof terminating within a Venturi chamber 166 formed in housing 163. The lower end of the Venturi chamber 166 is coincident to a passage 167 formed in housing 163. The passage 167 directs the wet steam from the Venturi chamber to the wet steam control valve 168. The construction and function of valve 168 is substantially the same as valves 97 and 151, heretofore described for mixing units 47 and 144, respectively. The valve stem 171 has the lower end thereof engaging valve head 169 and the upper end thereof exposed. The exposed end of stem 171 is adapted to be engaged by a control lever 172. Control lever 172 serves a dual purpose in that it can simultaneously regulate the flow of the wet steam through passage 167 and the flow of the condensate into the throat of the Venturi chamber 166. Lever 172 is adapted to pivot about point 182, as seen in Fig. 15. The condensate which is discharged into the throat of Venturi chamber 166 is controlled by valve 173 which in turn is controlled by lever 172.

The valve 173 is mounted within a chamber 175 formed in housing 163 which is interconnected to Venturi chamber 166 by a narrow passage 174. The valve stem 176 of valve 173 has the inner end 176*a* thereof tapered and restrictively positioned within passage 174. The outer end 176*b* of the stem 176 has a collar 177 formed thereon which is adapted to be slidably disposed within a guide member 178. The guide member 178, which is substantially channel-shaped in cross-section, is mounted on the side of control lever 172. The edges of the flanges 178' of member 178 are turned inwardly a slight amount such that the spacing between the inturned edges is less than the diameter of the collar 177 mounted on the valve stem 176, but greater than the diameter of the valve stem 176. Thus, a slight amount of play exists between the collared end 176*b* of the stem and the guide member 178, thereby enabling the lever 172 to freely pivot about point 182 without binding occurring between guide member 178 and the valve stem 176. Upon movement of the lever 172 to the left, as indicated in dotted lines in Fig. 14, the tapered end 176*a* of the valve stem is withdrawn from port 174 thus enabling the condensate to more readily flow into the throat of the Venturi chamber 166. The amount of sidewise movement of lever 172 is limited by a stop 180 which is adjustably mounted on a projecting arm 181 formed on adapter housing 163.

Figure 20:
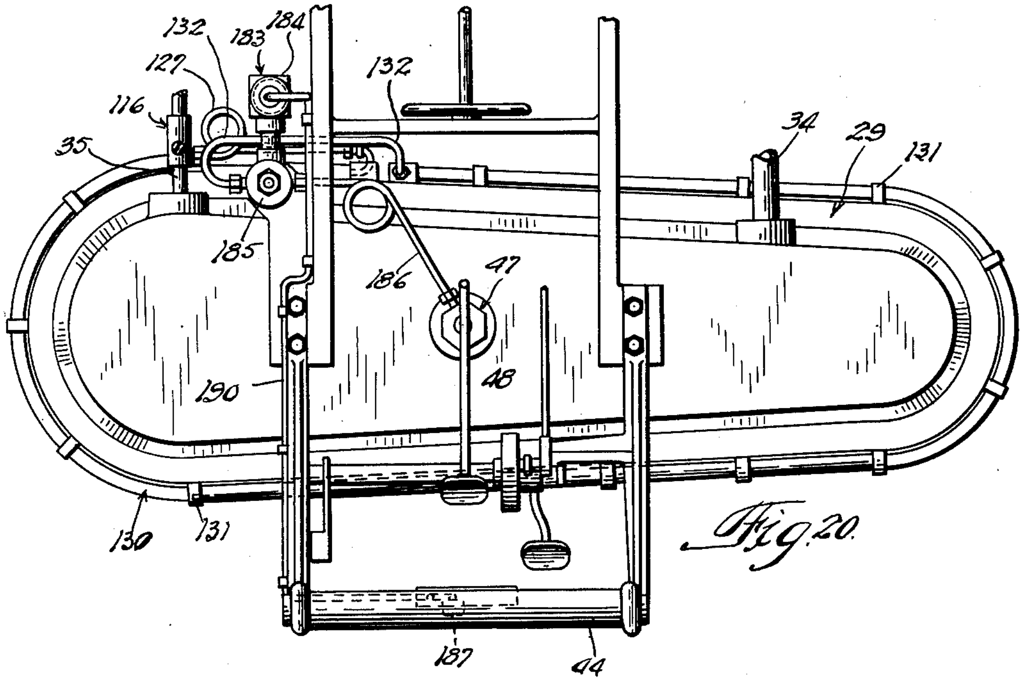
Fig. 20 is a fragmentary top plan view of a pressing head having a modified form of a condensate flow valve mounted thereon.
Figure 21:
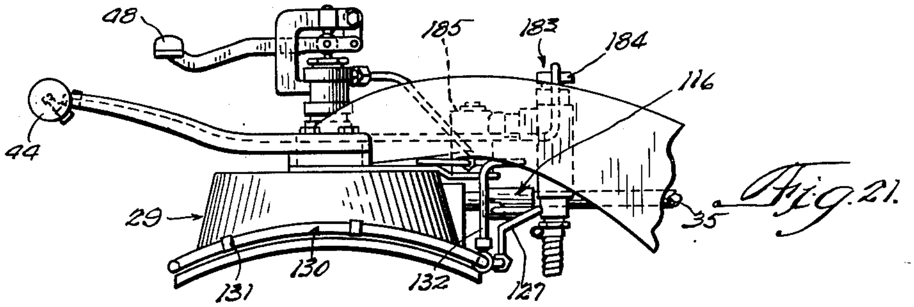
Fig. 21 is a right end view of the pressing head shown in Fig. 20.
Figure 22:
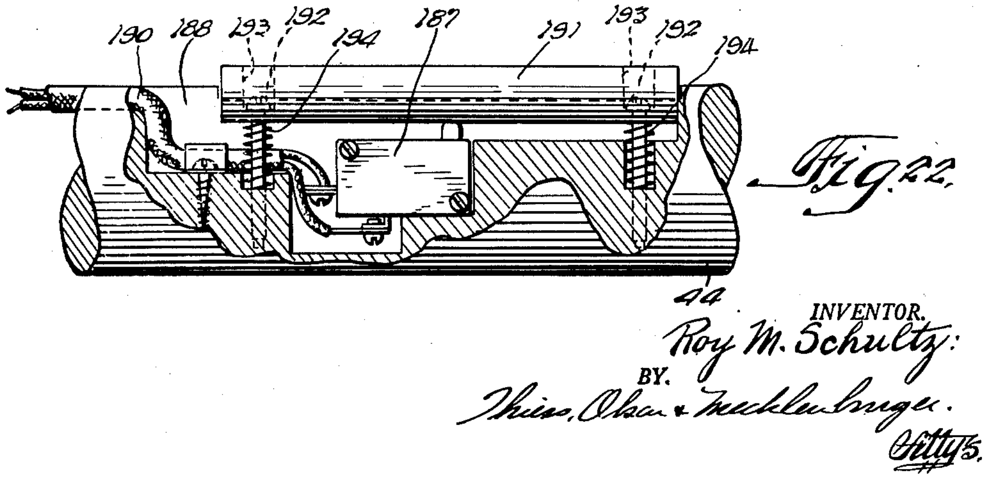
Fig. 22 is a fragmentary view of the switch for regulating the condensate flow valve shown in Fig. 20.

A modified form of condensate flow valve 183 is shown in Figs. 20 and 21. The valve is mounted on the backside of pressing head 29 and comprises a valve housing 185 and a solenoid 184 which is positioned adjacent said housing. The input side of the valve housing 185 is operatively connected by tube 132 to the outlet side of condenser 130. The output side of valve housing 185 is interconnected by a tube 186 with the mixing unit 47. The valve 183 is controlled by solenoid 184 which in turn is regulated by microswitch 187. The microswitch 187 is mounted within an elongated slot 188 formed in the backside of handle 44, see Fig. 22. The microswitch 187 is connected by suitable wiring 190 to the solenoid 184. A finger bar 191 is adjustably mounted within slot 188 and is secured to the handle 44 by guide screws 192. The screws 192 are disposed within countersunk openings 193 formed in finger bar 191 and are threaded into handle 44. The bar 191 upon being depressed is adapted to be moved longitudinally relative to the screws 192. A coil spring 194 embraces the shank of each screw 192 and serves to normally hold the finger bar 191 in an extended position relative to the backside of handle 44 as shown in Fig. 22. When the bar 191 is depressed the microswitch 187 is closed whereupon the solenoid 184 is energized and the valve 185 is opened thereby allowing the condensate from the condenser 130 to flow to mixing unit 47.

Figures 23, 24, 25, 26:
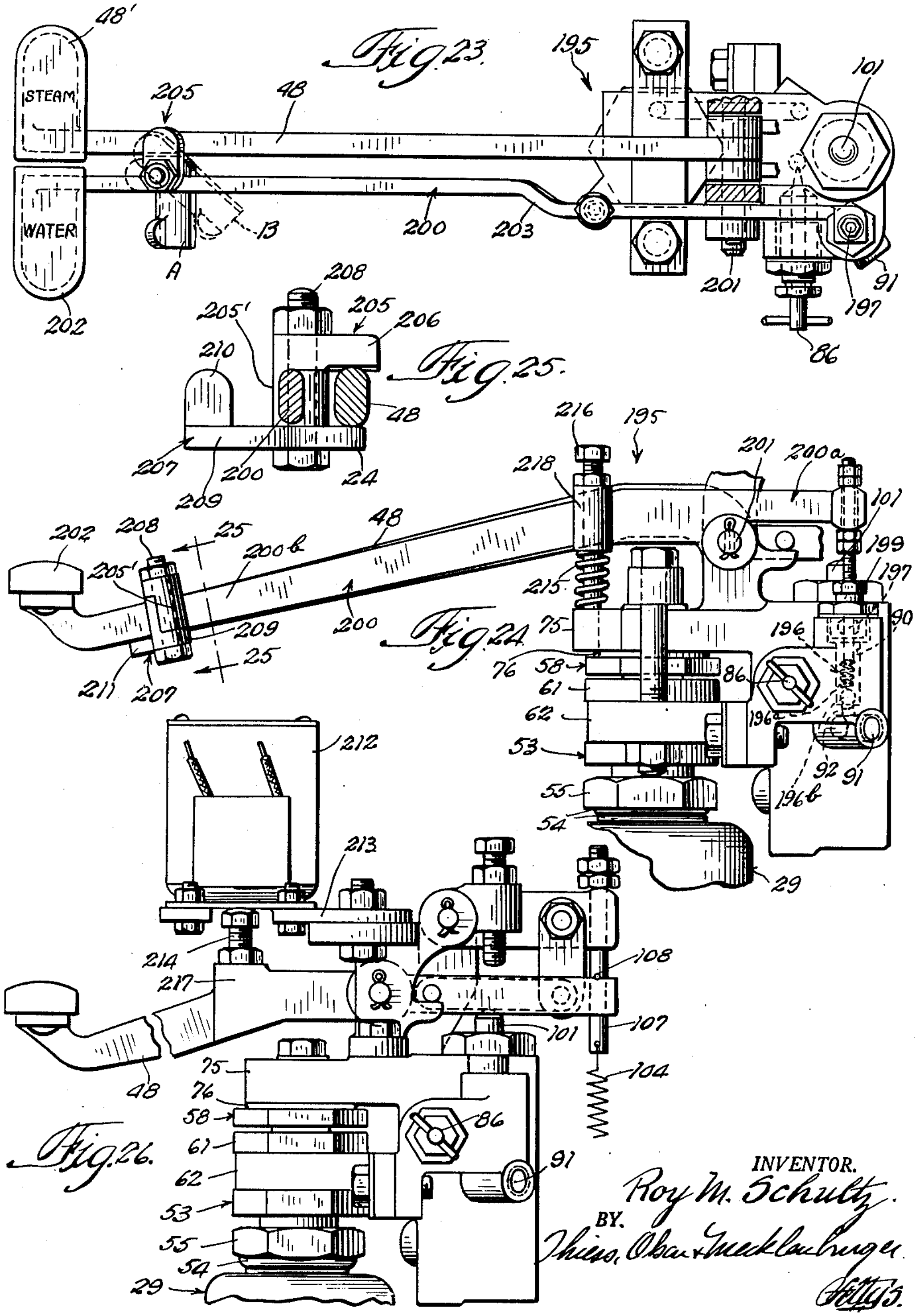
Fig. 23 is a fragmentary top plan view of a fourth modified form of a mixing unit.
Fig. 24 is a fragmentary side elevational view of the unit shown in Fig. 23.
Fig. 25 is a fragmentary sectional view of a fourth form of the mixing unit taken along line 25—25 of Fig. 24.
Fig. 26 is a fragmentary side elevational view of unit shown in Fig. 3 plus the addition of an actuating solenoid.

In Fig. 26, mixing unit 47 is shown in combination with a solenoid 212 which is mounted on a suitable bracket 213 above the adapter housing 75. The core of the solenoid 212 is adapted to actuate a bolt 214 which is threadably mounted on a boss 217 formed on control lever 48. The energization of solenoid 212 may be regulated by a microswitch arrangement similar to that shown in Fig. 22.

A fourth modified form of mixing unit 195 is shown in Figs. 23 through 25, which is of substantially the same construction as mixing unit 47 shown in Fig. 3. However, the ball check 93 disposed within passage 90 of mixing unit 47, as seen in Fig. 8, has now been replaced by a ball and spring combination 196, as shown in Fig. 24. One end of the spring 196*a* is adapted to engage the ball 196*b* and cause the ball to normally seal off passage 92 formed in the housing 75. The upper end of the spring 196*a* is secured to a plunger 197 which is disposed within passage 90 formed in the housing and extends upwardly therefrom. The plug 198 which capped the upper end of passage 90, as seen in Fig. 8, has been replaced in this instance by a guide bushing 199 through which the plunger 197 extends. The upper end of plunger 197 is operatively connected to one end 200a of a control lever 200. The lever 200 is pivotally mounted at point 201 to a bracket formed on housing 75. The control lever 200 is urged in a clockwise direction with respect to pivot point 201 by a coil spring 215 which embraces a stud bolt 216. The bolt 216 is mounted transversely on a boss 218 formed on lever 200 and on the opposite side of pivot point 201 from plunger 197. Affixed to the outer end 200b of lever 200 is a handle 202. The control lever 200 is offset at a point 203 toward lever 48 so that handle 202 on lever 200 is disposed adjacent a handle 48′ affixed to the free end of the control lever 48. Thus because of the proximity of handles 202 and 48′, the operator, with one hand, may readily regulate the mixing of the condensate and dry steam as well as the flow of the wet steam. Upon the depressing of lever 200 the tension of spring 196a on ball check 196b is relieved, thereby enabling the ball check 196b, which is normally seated on passage 92, to become unseated by the pressure of the condensate and the reduction of pressure created in the throat of the Venturi chamber by the flow of the dry steam therethrough. The extent to which control lever 200 is depressed will determine at what pressure differential the ball check 196b will be unseated and allow condensate to be discharged into the throat of the Venturi chamber.

Control lever 200 has mounted thereon, adjacent handle 202, a selector element 205 which enables the operator to manipulate control lever 48 independently or in concert with the control lever 200. However, the selector element 205 prevents the condensate control lever 200 being depressed independently of lever 48. Thus the possibility of discharging condensate without being mixed with steam has been prevented and the possibility of water spotting the garment to be pressed has been eliminated. The selector element 205 comprises a boss 205′ formed integrally of the lever 200 and having a center bore, not shown, and a finger 206 extending transversely therefrom. The finger 206 is immovable and is adapted to abut the upper edge of control lever 48, as seen in Fig. 25. Pivotally mounted on the underside of boss 205′ is a second finger 207, which is adapted to pivot about bolt 208 disposed within the center bore of the boss as an axis. One end 209 of finger 207 has formed thereon an upwardly extending knob 210, which serves to facilitate pivoting of the finger. The opposite end 211 of finger 207 is angularly disposed and is adapted when the finger 207 is in position A of pivotal adjustment, see Fig. 23, to engage the underside of lever 48, see Fig. 25. When finger 207 is in position A, the levers 48 and 200 will move as a unit. When finger 207 is moved to position B, shown in dotted lines in Fig. 23, the end portion 211 thereof is out of engagement with the underside of lever 48 thus enabling the operator to depress lever 48 independently of lever 200.

While the various forms of mixing units and condensers heretofore described have been shown in combination with a pressing head of a conventional type pressing machine, it is to be understood of course that they may be adapted to function effectively with the stationary buck of such a machine.

Thus it will be seen that a device has been provided for use in combination with a pressing element of a pressing machine which enables a portion of the steam contained within the steam chest of the pressing element to be utilized to obtain condensate which may subsequently be mixed with the remainder of the steam to produce a wet or supersaturated steam which will more readily effect proper softening of a wider variety of garment fabrics prior to pressing thereof.

Furthermore, a device has been provided which prevents the possibility of water spotting the garment to be pressed.

While several embodiments of this invention are shown above, it will be understood, of course, that the invention is not to be limited thereto, since many further modifications may be made, and it is contemplated, therefore, by the appended claims to cover any such modifications as fall within the true spirit and scope of this invention.

I claim:

1. In a garment pressing machine the combination of a pressing element having a compartment through which steam continuously circulates formed therein adjacent the pressing surface of said element, a water supply, and means mounted on said machine for effecting mixing of steam from said compartment with water from said supply prior to the distributing of said watered steam at the pressing surface of said element; said means comprising a housing mounted on said machine and having formed therein a pair of passages, one of said passages being operatively connected at one end to said compartment and at the other end terminating at the pressing surface of said element and being provided intermediate said ends with a Venturi section, the second passage being operatively connected at one end to said water supply and the other end thereof terminating within the Venturi section of said first passage, and a control valve mounted on said housing for regulating the flow of the watered steam from said housing.

2. In a garment pressing machine the combination of a movable pressing element having formed therein a compartment through which steam continuously circulates and which is disposed adjacent the pressing surface of said element to effect heating thereof, a water supply, and means mounted on said movable element for effecting mixing of steam from said compartment with water from said supply; said means comprising a housing having a mixing chamber formed therein, a conduit leading from said compartment to said chamber, a second conduit leading from said water supply to said chamber, a third conduit leading from said chamber to the pressing surface of said element, and a valve member mounted on said housing for regulating the rate of flow of the mixed steam and water through said third conduit; the rate of flow of water in said second conduit being dependent upon the rate of flow of the mixture in said third conduit.

3. In a garment pressing machine the combination of a pressing element having a steam compartment formed therein adjacent the pressing surface of said element, a water supply, and means mounted on said element for effecting mixing of steam from said compartment with water from said supply and discharging said mixture at said pressing surface; said means comprising a housing mounted on said element and having formed therein a mixing chamber, said chamber being operatively connected to said steam compartment and water supply, a conduit having one end thereof terminating in said mixing chamber and the other end thereof terminating adjacent said pressing surface, a control valve mounted on said housing for regulating the flow of said mixed steam and water through said conduit, and a second control valve mounted on said housing and adjustable independently of or simultaneously with said first control valve for regulating the maximum flow of water into said chamber.

4. A pressing machine comprising a pressing element having a compartment formed therein through which steam continuously circulates, means mounted on said element for effecting condensation of said steam subsequent to circulating through said compartment, a mixing unit mounted on said element and operatively connected to said compartment and said condensating means for effecting mixing of said steam and condensate, a conduit for said mixed steam and condensate having one end thereof terminating in said unit and the other end thereof terminating adjacent the pressing surface of said element, and a control mounted on said housing for regulating the flow of the mixed steam and condensate through said housing.

5. A pressing machine comprising a pressing element having formed therein a compartment provided with inlet and outlet passages through which steam continuously circulates, a condenser mounted on said element and having an intake port formed therein and operatively connected to the outlet passage of said compartment, a unit for mixing steam and condensate having inlet and outlet portions mounted on said element, the inlet portion of said unit being interconnected to said compartment and adapted to receive steam therefrom, a conduit leading from said condenser to the inlet portion of said unit, a second conduit leading from the outlet portion of said unit and terminating adjacent the pressing surface of said element, and a control mounted on said unit for regulating the flow of the mixed steam through said second conduit.

6. A pressing machine comprising a pressing element having formed therein a cavity provided with inlet and outlet passages through which steam continuously circulates for heating the pressing surface of said element, means mounted on said machine for condensing the steam upon passing through said outlet passage, a mixing unit mounted on said element and operatively connected to said cavity and condensing means for effecting a mixture of steam and condensate, and a conduit for said mixed steam and condensate leading from said unit to said pressing surface.

7. A pressing machine comprising a pressing element having formed therein a cavity provided with an inlet port and a pair of outlet ports for continuously circulating steam therethrough, a mixing unit having formed therein a chamber interconnected to one of the outlet ports of said cavity, a hollow member mounted on said element and interconnected to the second outlet port of said cavity for effecting partial condensation of the steam passing from said cavity through said second outlet port, a condensate conduit leading from said hollow member to said chamber, a discharge conduit leading from said chamber to the pressing surface of said element.

8. A pressing machine comprising a pressing element mounted thereon having a steam cavity through which steam continuously circulates formed therein adjacent the pressing surface of said element, a steam conduit communicating with said cavity and the pressing surface of said pressing element, and means communicating with a portion of said conduit intermediate said cavity and pressing surface for effecting saturation of the steam when the latter is flowing from said cavity to said pressing surface.

9. A device for use with a pressing machine having a pressing element provided with a steam chest, through which steam continuously circulates, disposed adjacent the pressing surface thereof, comprising a housing mounted on said element and provided with a Venturi mixing chamber, a steam input conduit leading to said chamber from said chest, a water input conduit angularly disposed with respect to said steam input conduit leading to said chamber from a water supply, a mixture output conduit leading from said chamber to the pressing surface, and a control mounted on said housing and cooperating with said output conduit for regulating the flow of the mixture therethrough from said mixing chamber.

10. A device for use with a pressing element of a pressing machine having a cavity formed therein adjacent the pressing surface thereof through which steam continuously circulates, comprising a Venturi mixing chamber mounted on said element and operatively connected to said cavity, a steam condenser unit operatively connected to said cavity and said mixing chamber, a conduit for mixed steam and condensate leading from said mixing chamber to the pressing surface of said pressing element, and a control mounted on said machine for regulating the flow of steam from said cavity through said mixing chamber; the proportion of steam condensate to steam in said conduit being dependent upon the rate of flow of the steam from said cavity through said hollow member.

11. A device for use with a rockably mounted head of a pressing machine having a cavity formed in said head adjacent the pressing surface thereof through which steam continuously circulates, comprising a hollow member provided with a plurality of ports formed therein mounted on said head, one of said ports being operatively connected to said cavity, a steam condensing unit mounted on said head and movable therewith, said unit being operatively connected to a second port formed in said member, the steam condensate collected in said unit being adapted to pass from said unit to said member only when said head is in one position of rockable adjustment, a conduit for mixed steam and condensate operatively connected to a third port formed in said member, and a control mounted on said conduit for regulating the rate of flow of said mixed steam and condensate.

12. A device for use with a pressing machine having a pressing element with a cavity formed therein through which steam is circulated, comprising a hollow steam and condensate mixing member operatively connected to said cavity, a steam condenser mounted on said element and having the input side thereof operatively connected to said cavity and the output side thereof operatively connected to said mixing member, a control valve mounted on said member for regulating the flow of condensate to said member, an operative connection between said member and the pressing surface of said pressing element, a second control valve mounted on said member for regulating the flow of the mixed condensate and steam from said member, and a lever mounted on said member for actuating said valves whereby said second control valve may be operated independently of or simultaneously with said first mentioned control valve.

13. A device for use with a pressing machine having a pressing element with a cavity formed therein through which steam is circulated, comprising a hollow steam and condensate mixing member operatively connected to said cavity, a steam condenser mounted on said element and having the input side thereof operatively connected to said cavity and the output side thereof operatively connected to said mixing member, a control valve mounted on said member for regulating the flow of condensate to said member, an operative connection between said member and the pressing surface of said pressing element, a second control valve mounted on said member for regulating the flow of the mixed condensate and steam from said member, and a lever adjustably mounted on said member and adapted, when moved in one direction, to actuate said second control valve and, when moved in said one direction and a second direction transverse with respect to said one direction, to effect simultaneous actuation of said valves.

14. A device for use with a pressing machine having a pressing element with a cavity formed therein through which steam is circulated, comprising a hollow steam and condensate mixing member operatively connected to said cavity, a steam condenser mounted on said element and having the input side thereof operatively connected to said cavity and the output side thereof operatively connected to said mixing member, a control valve mounted on said member for regulating the flow of condensate to said member, an operative connection between said member and the pressing surface of said pressing element, a second control valve mounted on said member for regulating the flow of the mixed condensate and steam from said member, and a lever pivotally mounted on said member and adapted, when depressed, to actuate said second control valve, and when first depressed and then moved in a sidewise direction, to effect simultaneous actuation of said valves; the amount of sidewise movement of said lever determining the ratio of steam to condensate in the flow of the mixed condensate and steam from said member.

15. A device for use with a rockably mounted pressing head having formed therein a cavity through which steam continuously circulates, comprising a steam and condensate mixing unit mounted on said head and having one side thereof in operative connection with said cavity, an elongated steam condenser mounted circumferentially on said head and operatively connected to said cavity and said unit, and a control valve mounted on said unit for regulating the flow of steam from said cavity through said unit.

16. A device for use with a rockably mounted pressing head having formed therein a cavity adjacent the pressing surface thereof through which steam circulates, comprising a steam and condensate mixing unit mounted on said head, said unit having an input and an output side, said input side being operatively connected to said cavity, an elongated steam condenser mounted circumferentially on said head and adapted to receive steam from said cavity, an operative connection from said condenser to the input side of said unit, a control element disposed intermediate said cavity and condenser and adapted to allow flow of steam from said cavity to said condenser only when said head is in a substantially pressing position, an operative connection from the output side of said unit to the pressing surface of said head, and a flow valve mounted on the output side of said unit for regulating the flow of mixed steam and condensate from said unit through said last operative connection, the rate of the flow of condensate into said unit being dependent upon the rate of flow of said mixed steam and condensate from said unit.

17. A device for use with a pressing machine having a pressing element provided with a cavity through which steam is circulated, comprising a steam and condensate mixing unit mounted on said element and having one side thereof in operative connection with said cavity, a steam condenser mounted on said element and having one side thereof in operative connection with said cavity and the other side thereof in operative connection with said one side of said unit, a remotely-controlled condensate flow valve mounted intermediate said condenser and said unit, a conduit for mixed steam and condensate leading from the other side of said unit and terminating at the pressing surface of said element, and a second flow valve for said mixed steam and condensate mounted on said other side of said unit, said first flow valve being effective only in combination with said second flow valve.

References Cited in the file of this patent

UNITED STATES PATENTS

| Number | Name | Date |
|---|---|---|
| 1,996,714 | Beede | Apr. 2, 1935 |
| 2,387,757 | Hoecker | Oct. 30, 1945 |